US008435355B2

(12) United States Patent
Gifford et al.

(10) Patent No.: US 8,435,355 B2
(45) Date of Patent: May 7, 2013

(54) FRACTIONATION OF LIGNOCELLULOSIC MATERIAL USING IONIC LIQUIDS

(75) Inventors: Angela P. Gifford, Seattle, WA (US); David E Severeid, Puyallup, WA (US)

(73) Assignee: Weyerhaeuser NR Company, Federal Way, WA (US)

(*) Notice: Subject to any disclaimer, the term of this patent is extended or adjusted under 35 U.S.C. 154(b) by 597 days.

(21) Appl. No.: 12/344,906

(22) Filed: Dec. 29, 2008

(65) Prior Publication Data

US 2010/0163018 A1 Jul. 1, 2010

(51) Int. Cl.
 *C13K 1/02* (2006.01)
 *C13B 10/00* (2011.01)
(52) U.S. Cl.
 USPC .............................................. 127/37; 127/43
(58) Field of Classification Search .................. None
 See application file for complete search history.

(56) References Cited

U.S. PATENT DOCUMENTS

| 6,824,599 | B2 | 11/2004 | Swatloski |
| 2006/0241287 | A1 | 10/2006 | Hecht |
| 2007/0215300 | A1 | 9/2007 | Upfal |
| 2008/0023162 | A1 | 1/2008 | Myllymaki |
| 2008/0188636 | A1 | 8/2008 | Argyropoulos |
| 2008/0190013 | A1* | 8/2008 | Argyropoulos ................. 44/307 |
| 2008/0227162 | A1* | 9/2008 | Varanasi et al. ................. 435/96 |
| 2010/0234586 | A1* | 9/2010 | O'Connor et al. .............. 536/56 |

FOREIGN PATENT DOCUMENTS

| DE | 10 2005 017 715 A1 | 10/2006 |
| WO | 2005/017252 A1 | 2/2005 |
| WO | 2005/098546 A2 | 10/2005 |
| WO | 2006/108861 A2 | 10/2006 |
| WO | 2006/116126 A2 | 11/2006 |
| WO | 2008/043837 A1 | 4/2008 |
| WO | 2008/095252 A1 | 8/2008 |
| WO | 2008/098032 A2 | 8/2008 |

OTHER PUBLICATIONS

Brauns, F.E., et al., "Lignin Ethers and Esters: Preparation From Lead and Other Metallic Derivatives of Lignin," Industrial & Engineering Chemistry 37(1):1-82A, Jan. 1945.
Chen, Y.-R., and S. Sarkanen, "A Brief History of Lignin Containing Polymeric Materials Culminating in X-Ray Powder Diffraction Analysis of Kraft Lignin Based Thermoplastic Polymer Blends" (Chap. 15), in D.S. Argyopoulous (ed.), "ACS Symposium Series 954: Materials, Chemicals and Energy From Forest Biomass," American Chemical Society, D.C., 2007, pp. 229-246.
Chen, Y.-R., and S. Sarkanen, "From the Macromolecular Behavior of Lignin Components to the Mechanical Properties of Lignin-Based Plastics," Cellulose Chemistry and Technology 40(3-4):149-163, 2006.
El Seoud, O.A., et al., "Applications of Ionic Liquids in Carbohydrate Chemistry: A Window of Opportunities," Biomacromolecules 8(9):2629-2647, Aug. 2007.

Fort, D.A., et al., "Can Ionic Liquids Dissolve Wood? Processing and Analysis of Lignocellulosic Materials With 1-n-Butyl-3-Methylimidazolium Chloride," Green Chemistry 9(1):63-69, 2007.
Fukaya, Y., et al., "Superior Solubility of Polysaccharides in Low Viscosity, Polar, and Halogen-Free 1,3-Dialkylimidazolium Formates," Biomacromolecules 7(12):3295-3297, Dec. 2006.
Glasser, W.G., and R.K. Jain, "Lignin Derivatives. 1: Alkanoates," Holzforschung 47(3):225-233, 1993.
Honglu, X., and S. Tiejun, "Wood Liquefaction by Ionic Liquids," Holzforschung 60(5):509-512, 2006.
Kilpeläinen, I., et al., "Dissolution of Wood in Ionic Liquids," Journal of Agricultural and Food Chemistry 55(22):9142-9148, Oct. 2007.
Lee, K.S., "Application of Ionic Liquid in Separation of Cellulosic Material From Lignin in Sawdust," Proceedings of the 11th Annual Green Chemistry and Engineering Conference, D.C., Jun. 26-29, 2007, 1 page.
Li, C., et al., "Acid in Ionic Liquid: An Efficient System for Hydrolysis of Lignocellulose," Green Chemistry 10(2):177-182, 2008.
Li, Y., and S. Sarkanen, "The First Alkylated 95-100% Kraft Lignin Based Plastics," Proceedings of the 9th International Symposium on Wood and Pulping Chemistry (ISWPC), Montreal, Jun. 9-12, 1997, pp. 63-1-63-6.
Li, Y., and S. Sarkanen, "Plasticizers That Transform Alkylated Kraft Lignins Into Versatile Thermoplastics," Proceedings of the 10th International Symposium on Wood and Pulping Chemistry (ISWPC), Main Symposium, Yokohama, Japan, Jun. 7-10, 1999, pp. 492-495.
Li, Y., and S. Sarkanen, "Thermoplastics With Very High Lignin Contents," in W.G. Glasser et al. (eds.), "ACS Symposium Series 742: Lignin: Historical, Biological, and Materials Perspectives," American Chemical Society, D.C., 2000, pp. 351-366.
Lora, J.H., and W.G. Glasser, "Recent Industrial Applications of Lignin: A Sustainable Alternative to Nonrenewable Materials," Journal of Polymers and the Environment 10(112):39-48, Apr. 2002.
Naveau, H.P., "Methacrylic Derivatives of Kraft Lignin," Canadian Wood Chemistry Symposium, Mont Gabriel, Quebec, Canada, Sep. 1-3, 1976, pp. 51-54.
Pu, Y., et al., "Ionic Liquid as a Green Solvent," Journal of Wood Chemistry and Technology 27(1):23-33, Jan. 2007.
Rayne, S., and G. Mazza, "Rapid Dissolution of Lignocellulosic Plant Materials in an Ionic Liquid," Nature Precedings, Aug. 7, 2007, <http://hdl.handle.net/10101/npre.2007.637.1>, pp. 1-22.

(Continued)

Primary Examiner — Emily Le
Assistant Examiner — Michael Forrest
(74) Attorney, Agent, or Firm — Weyerhaeuser Law Dept

(57) ABSTRACT

Lignocellulosic biomass materials are fractionated by dissolving at least a portion of the lignocellulosic material in an ionic liquid and separating the resulting mixture into a cellulose-enriched fraction and/or a lignin-enriched fraction. The cellulose-enriched fraction contains about 10 percentage points more glucose than the weight percent glucose contained in the original lignocellulosic biomass material. In certain embodiments, the lignin-enriched fraction includes a lignin content that is 5 percentage points greater than the weight percent lignin present in the original lignocellulosic material. The techniques used to isolate the cellulose-enriched fractions and/or the lignin-enriched fractions from the ionic liquid mixture do not employ environmentally unfriendly solvents.

20 Claims, 6 Drawing Sheets

OTHER PUBLICATIONS

Viswanathan, G. et al., "Preparation of Biopolymer Fibers by Electrospinning From Room Temperature Ionic Liquids," Biomacromolecules 7(2):415-418, Jan. 2006.

Xie, H. et al., "Through Chemical Modification of Wood-Based Lignocellulosic Materials in Ionic Liquids," Biomacromolecules 8(12):3740-3748, Dec. 2007.

Zhu, S., "Perspective: Use of Ionic Liquids for the Efficient Utilization of Lignocellulosic Materials," Journal of Chemical Technology and Biotechnology 83(6):777-779, Jun. 2008.

Diego A. Fort, et al., Use of ionic liquids in the study of fruit ripening by high-resolution 13C NMR spectroscopy: 'green' solvents meet green bananas, Chem. Commun., 2006, 714-176, Columbia, MO, USA.

Jason S. Moulthrop, et al., High-resolution 13C NMR studies of cellulose and cellulose oligomers in ionic liquid solutions, Chem. Commun., 2005, 1557-1559, Columbia, MO, USA.

Roberto Rinaldi, et al., Instantaneous dissolution of cellulose in organic electrolyte solutions, Chem. Commun, 2011, 511-513, DOI: 10.1039/C0CC02421J.

Sarah Kohler, et al, New Solvents for Cellulose: Dimethyl Sulfoxide/ Ammonium Fluorides, Macromolecular Bioscience 2007, 3007-314, DOI: 10.1002/mabi.200600197.

Celine Cuissinat, et al., Swelling and dissolution of cellulose. Part IV: Free floating cotton and wood fibres in ionic liquids, 2007, Elsevier Ltd, DOI: 10.1016/carbpol.2007.09.029.

* cited by examiner

FRACTIONATION OF LIGNOCELLULOSIC MATERIAL USING IONIC LIQUIDS

TECHNICAL FIELD

The present disclosure relates to processes for fractionating lignocellulosic materials into cellulose-enriched and lignin-enriched fractions using ionic liquids.

BACKGROUND

The efficient utilization of different biomass has attracted increasing attention due to the diminishing resources of fossil fuels as well as global warming warnings caused by greenhouse gas emissions. This interest has prompted work towards techniques for converting biomass to valuable products, such as biofuels, chemicals, and other biomaterials.

Wood, being one of the most abundant lignocellulosic materials available on the planet, to date, has mainly been utilized for the production of paper products from cellulose and as a raw material for building products.

Other lignocellulosic biomass materials, such as non-wood sources, e.g., sugar cane, switchgrass, and the like, as well as agricultural waste, forest residuals, and recovered lignocellulosic fiber, are other readily available sources of biomass that include components that can be recovered and converted to valuable products, such as biofuels, chemicals, and biomaterials.

The main components of lignocellulosic biomass materials are cellulose, lignin, hemicellulose, and extractives.

The lignin component is a vastly underutilized natural polymer. Lignin generated by the paper industry is typically utilized as a fuel in a chemical pulping process. Other uses of lignin include as a stabilizer for plastics and rubber, as well as in the formulation of dispersants, adhesives, and surfactants.

Ionic liquids are liquids that contain essentially only ions. Some ionic liquids are in a dynamic equilibrium where at any time more than 99.99% of the liquid is made up of ionic rather than molecular species. In the broad sense, the term "ionic liquid" includes all molten salts; however, the term "ionic liquid" is commonly used for salts whose melting point is relatively low (e.g., below 100° C.). In particular, the salts that are liquid at room temperature are often referred to as room temperature ionic liquids, or RTILs. Ionic liquids are generally considered to be environmentally friendly solvents in the sense that they are not volatile at normal operating temperatures. This is viewed favorably in light of the growing realization of the need to protect the environment. Furthermore, some ionic liquids have a chemical composition that is considered "green".

Although using ionic liquids as solvents to dissolve lignocellulosic biomass materials has been reported, development of practical utilizations of the solubility of lignocellulosic biomass material in ionic liquids is in its infancy.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure describes processes for fractionating a lignocellulosic material comprising cellulose, hemicellulose, and lignin into a cellulose-enriched fraction, a lignin-enriched fraction, or both. The described processes employ an ionic liquid in which the lignocellulosic material is dissolved.

In one embodiment of the processes described herein, a lignocellulosic material is contacted with an ionic liquid. Cellulose and hemicellulose of the lignocellulosic material dissolve into the ionic liquid along with a portion of the lignin making up the lignocellulosic material. The dissolution results in a mixture that includes dissolved cellulose, dissolved hemicellulose, dissolved lignin, undissolved lignin, and ionic liquid. The mixture is separated into a cellulose-enriched fraction that is characterized by a weight percent glucose from cellulose and hemicellulose that is at least about 10 percentage points greater than the weight percent glucose attributable to cellulose and hemicellulose in the starting lignocellulosic material.

In another embodiment, the cellulose-enriched fraction is separated from the mixture by centrifuging.

In yet another embodiment, a lignin-enriched fraction is separated from the mixture where the lignin-enriched fraction is characterized by a weight percent of lignin that is at least about 5 percentage points greater than the weight percent of lignin in the starting lignocellulosic material.

In another embodiment, the lignin-enriched fraction is separated from the mixture by centrifuging.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
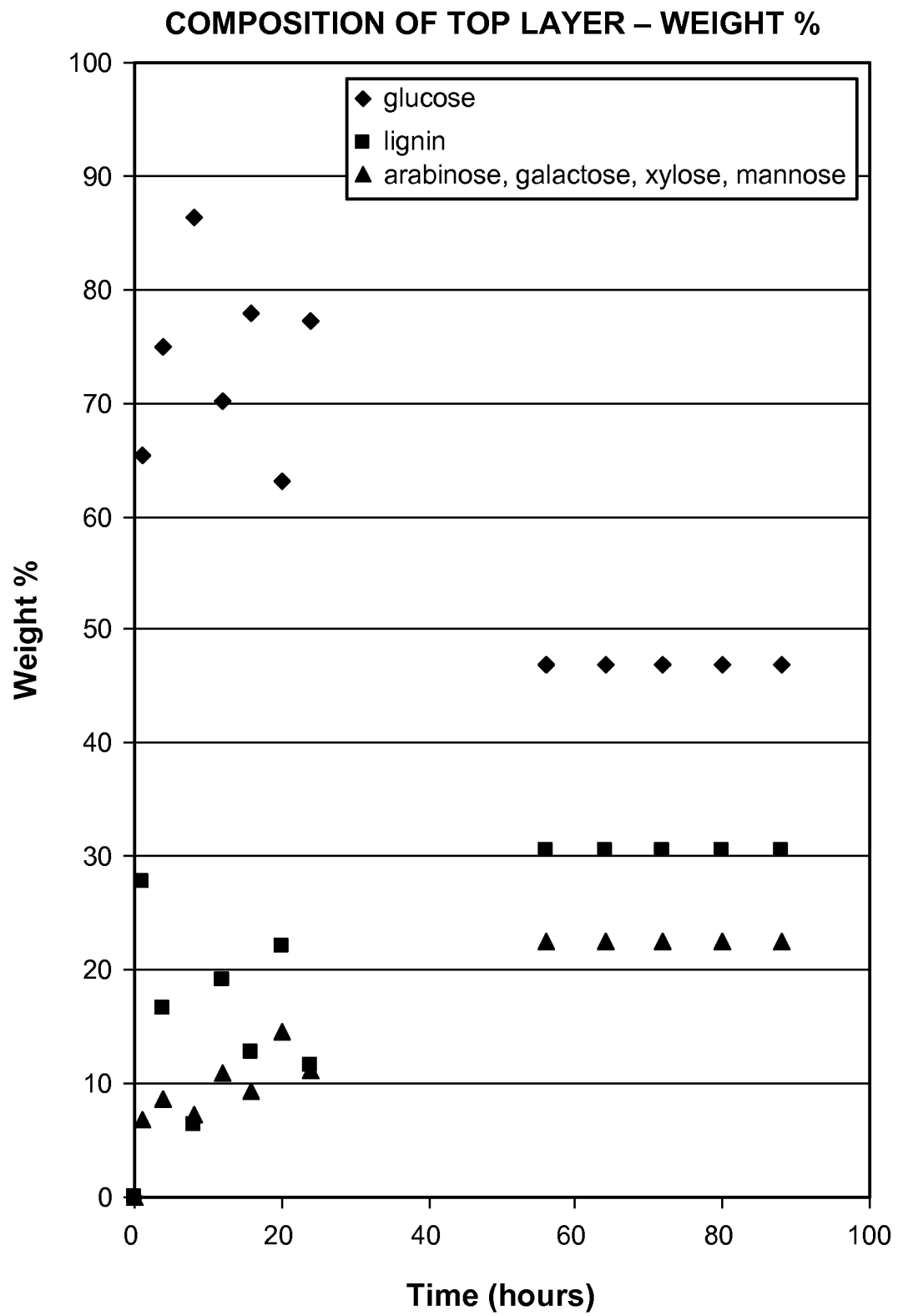
FIG. 1 is a graph of the weight percent of components in the top layer as reported in Table 4.
Figure 2:
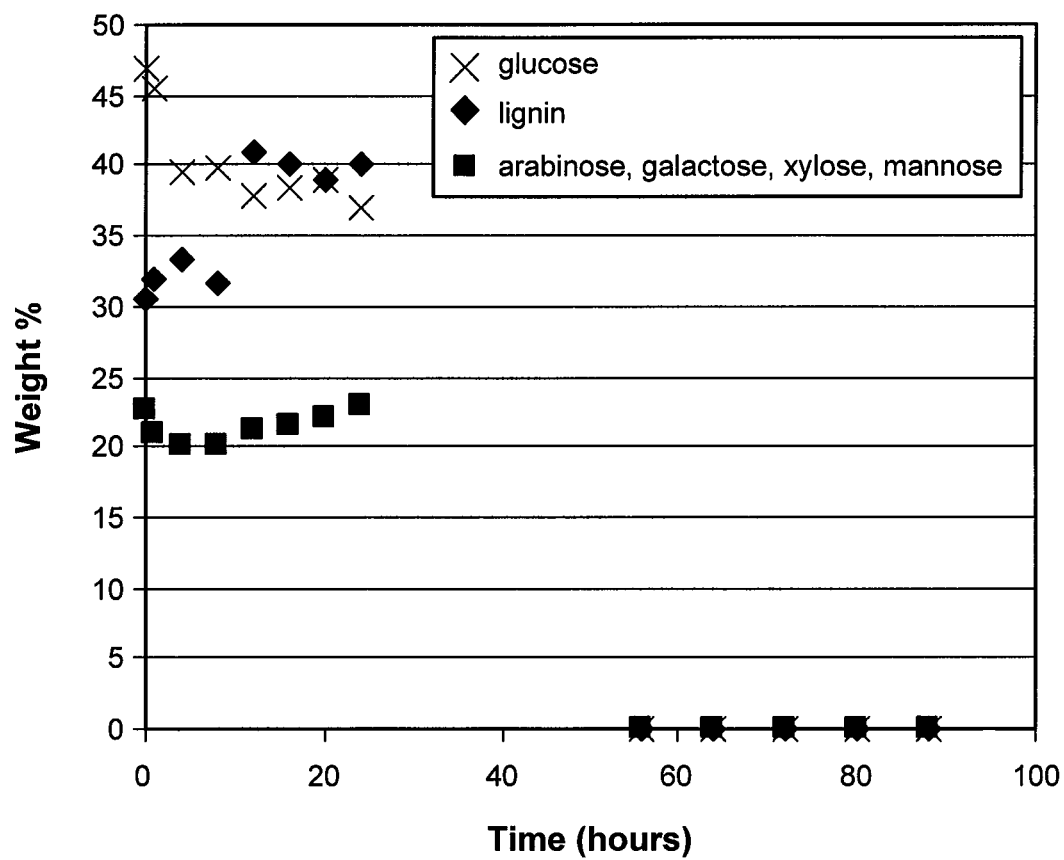
FIG. 2 is a graph of the weight percent undissolved components and/or bottom layer reported in Table 5.
Figure 3:
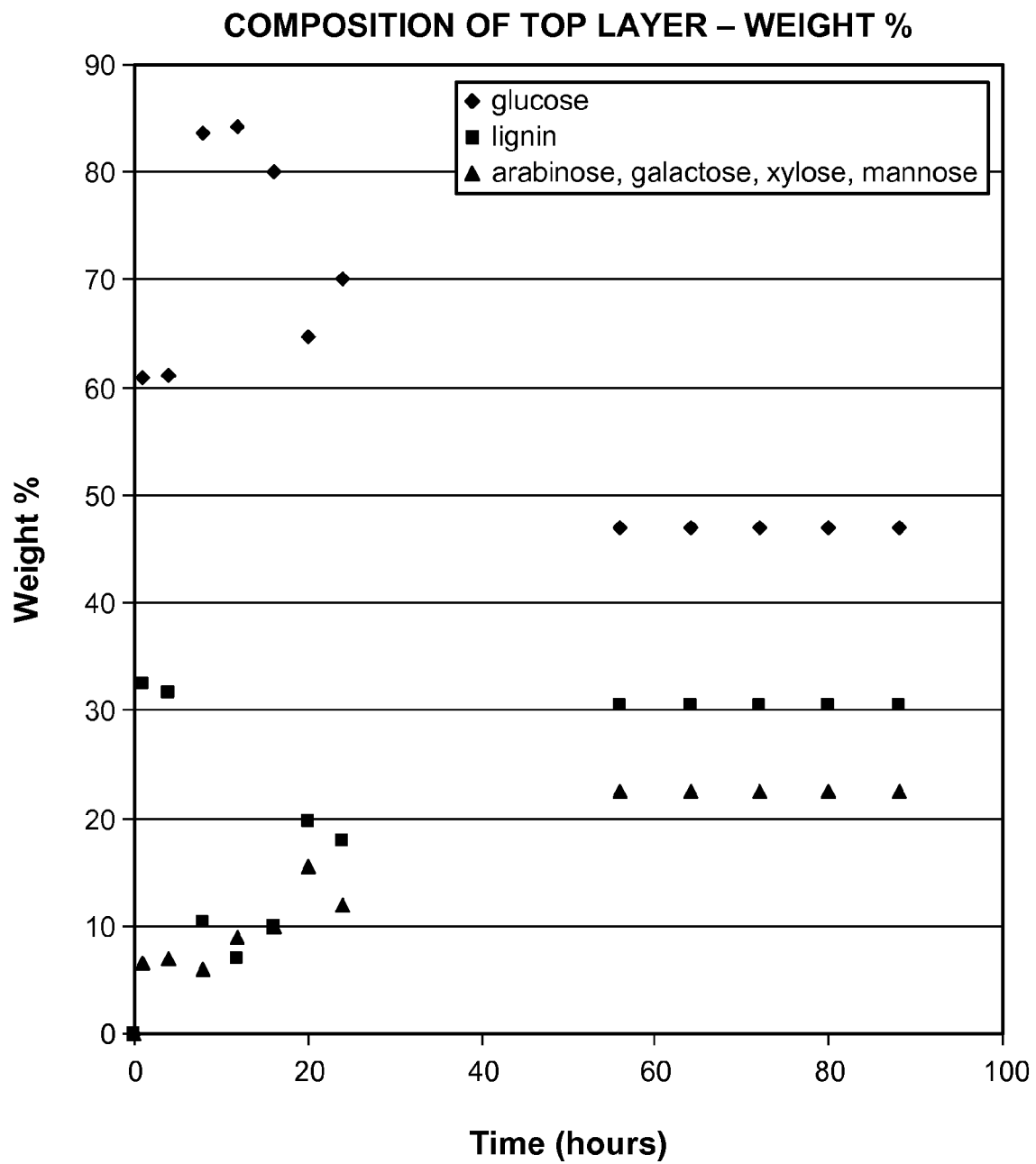
FIG. 3 is a graph of the weight percent of components in the top layer as reported in Table 8.
Figure 4:
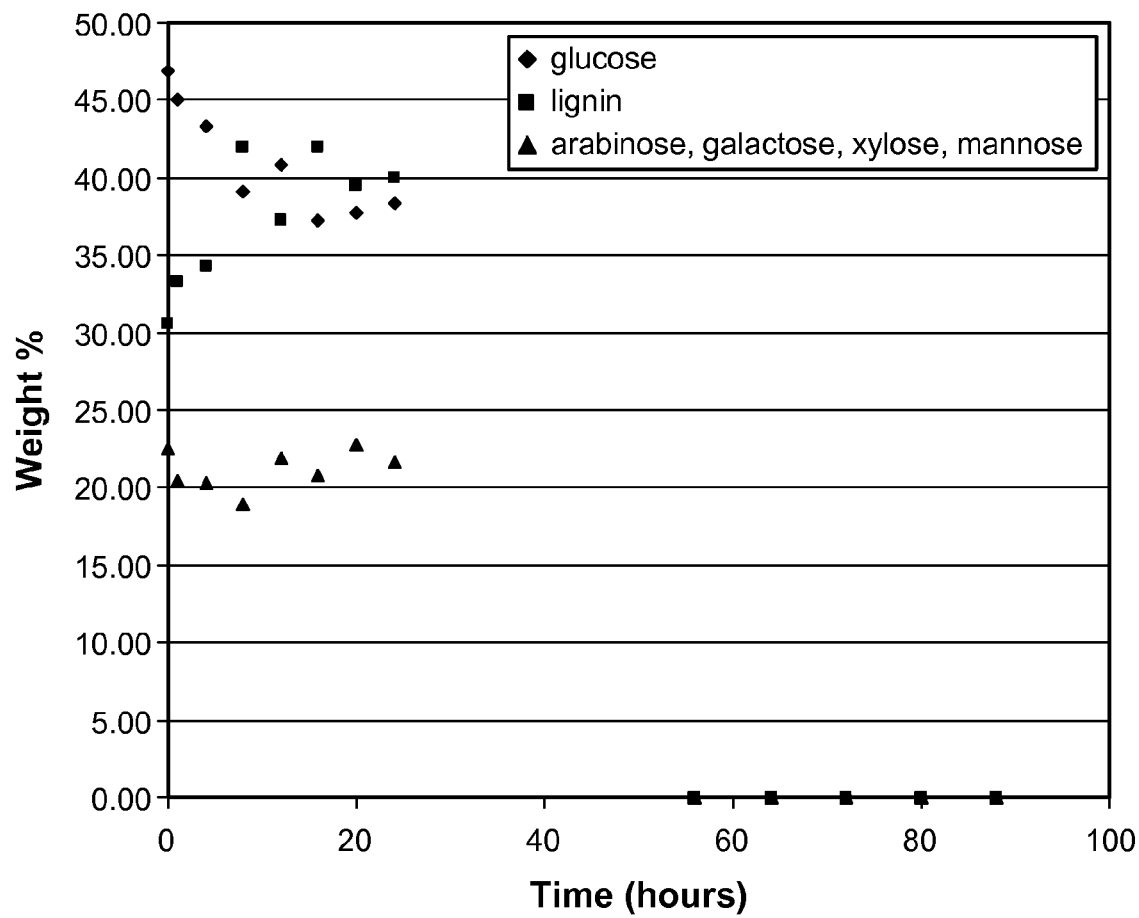
FIG. 4 is a graph of the weight percent undissolved components and/or bottom layer reported in Table 9.
Figure 5:
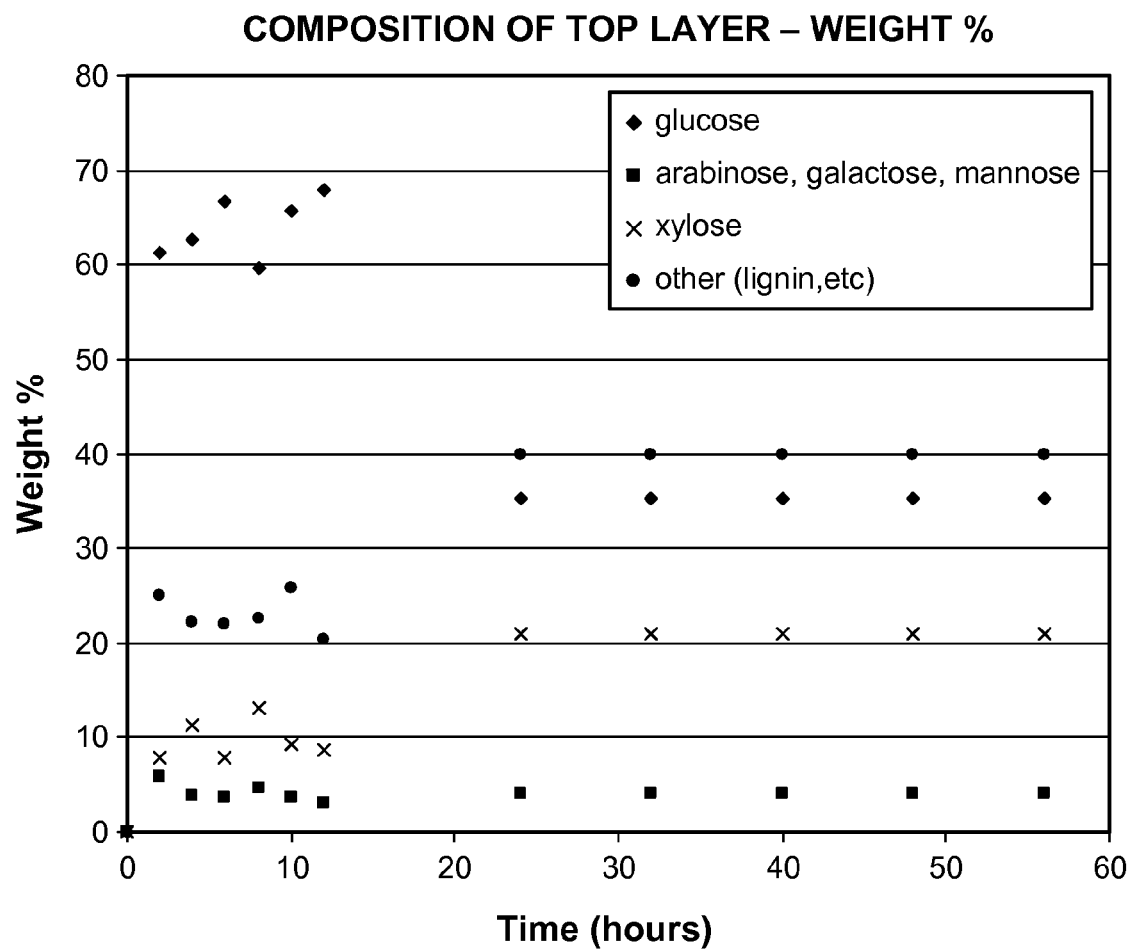
FIG. 5 is a graph of the weight percent of components in the top layer as reported in Table 12.
Figure 6:
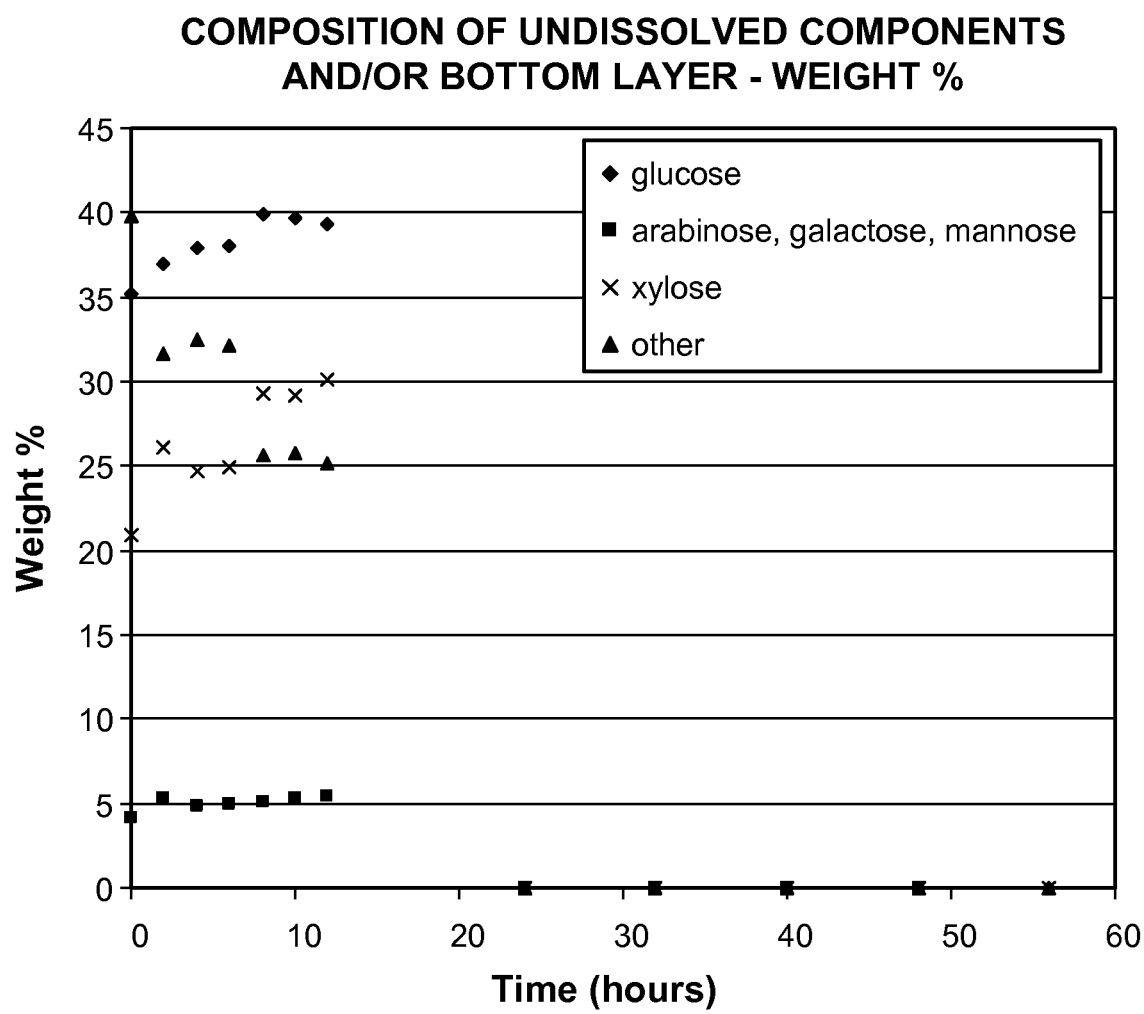
FIG. 6 is a graph of the weight percent of undissolved components and/or bottom layer reported in Table 13.

Embodiments for fractionating lignocellulosic biomass material into a cellulose-enriched fraction and/or a lignin-enriched fraction are described. The cellulose-enriched fraction and the lignin-enriched fraction resulting from the processes described herein can be further processed to further isolate cellulose and/or lignin in a more pure form. The resulting recovered cellulose and lignin will be useful in the production of cellulose-containing products and lignin-containing products.

The processes described herein use ionic liquids to dissolve cellulose and hemicellulose of lignocellulosic biomass material and partially dissolve lignin of the lignocellulosic biomass material. The processes separate the mixture of dissolved cellulose, dissolved hemicellulose, dissolved lignin, and undissolved lignin into a cellulose-enriched fraction and/or a lignin-enriched fraction. As used herein, "cellulose-enriched fraction" means a mixture of an ionic liquid, dissolved cellulose, and dissolved hemicellulose, characterized by a weight percent glucose solids from the dissolved cellulose and hemicellulose in the fraction that is at least about 10 percentage points, more preferably at least about 15 percentage points, greater than the weight percent of glucose making up the cellulose and hemicellulose in the original lignocellulosic biomass material. The phrase "lignin-enriched fraction" means a mixture of an ionic liquid and dissolved and undissolved lignin wherein the weight percent of lignin solids in the fraction is at least about 5 percentage points greater than the weight percent of lignin in the original lignocellulosic biomass material.

Lignocellulosic biomass material refers to plant biomass that is composed of cellulose, hemicellulose, and lignin. In lignocellulosic materials, the carbohydrate polymers of cellulose and hemicellulose are tightly bound to lignin by hydrogen and covalent bonds. Lignocellulosic material comes in many different types, which may be grouped into four major categories: (1) wood residues (including sawmill and paper mill discards); (2) municipal paper waste; (3) agricultural residues (including corn stover and sugar cane bagasse); and (4) dedicated energy crops (which are mostly composed of fast growing, tall, woody grasses, such as switchgrass). Specific examples of lignocellulosic materials include southern pine wood chips and switchgrass as well as tobacco, corn residues, corn husks, caster oil plant, rapeseed plant, soybean plant, cereal straw, grain processing byproducts, bamboo, bamboo pulp, bamboo sawdust, rice straw, and recycled pulp.

Cellulose is a polysaccharide formed of 1,4-linked glucose units. Cellulose is the most abundant organic chemical on the earth, and there is an estimated annual biosphere production of approximately $90 \times 10^9$ metric tons of the material.

Lignin is most commonly derived from wood and is an integral part of the cell walls of plants. It is a three-dimensional amorphous natural polymer containing phenylpropane units that are substituted with hydroxyl groups, and methoxyl groups. Lignin makes up about one-quarter to one-third of the dry mass of wood and generally lacks a defined primary structure.

Hemicellulose can be any of several heteropolymers (matrix polysaccharides) present in almost all plant cell walls along with cellulose. Hemicellulose has a random, amorphous structure with little strength. It is easily hydrolyzed by dilute acid or base as well as a myriad of hemicellulase enzymes. Hemicellulose contains many different sugar monomers. For instance, besides glucose, sugar monomers in hemicellulose can include xylose, mannose, galactose, rhamnose, and arabinose. Hemicelluloses contain most of the D-pento sugars and occasionally small amounts of L-sugars as well.

Lignocellulosic materials also include extractives such as silica, organic acids, tall oil, and proteins.

The processes of the present disclosure are described below in more detail with reference to exemplary lignocellulosic materials of southern pine and switchgrass; however, it should be understood that the processes specifically described herein are not limited in application to these two types of lignocellulosic materials.

Southern pine is a softwood. Softwood is a generic term typically used in reference to woods from conifers such as pine, spruce, cedar, fir, larch, Douglas fir, hemlock, cypress, redwood, and yew. The processes described herein are not limited to softwoods and are applicable also to hardwoods, which are typically used in reference to wood from broad-leaved or angiosperm trees.

The present disclosure makes reference to lignocellulosic material; however, such term does not necessarily exclude the use of materials that may be more specifically defined as cellulosic materials or ligninic materials. Rather, the term lignocellulosic is intended to broadly refer to biomass materials that may be primarily formed of cellulose, lignin, or lignocellulose. Thus, as used herein, lignocellulosic can mean materials derived from woody sources, grassy sources, and other plant sources generally. Specifically, lignocellulosic can mean a material comprised partly or mainly of lignin, cellulose, or lignocellulose.

Table 1 below provides a listing of the generally understood glucose (from cellulose and hemicellulose), lignin, other sugars (from hemicellose) and extractives content of acetone extracted southern pine and switchgrass reported in their monomeric values.

TABLE 1

Monomeric Carbohydrate and Lignin Components of
Acetone Extracted Southern Pine Wood Chips and Switchgrass*

|  | SOUTHERN PINE (WT %) | SWITCHGRASS (WT %) |
|---|---|---|
| Glucose | 47.0 | 35 |
| Other Sugars | 22.5 | 25 |
| Lignin | 30.5 | 22 |
| Extractives | — | 8 |

*The carbohydrate and lignin composition of switchgrass can vary, depending upon the time of year the switchgrass is harvested and other conditions.

Various types of ionic liquids are known. Nonlimiting examples of ionic liquids include materials formed of a cation and an anion, wherein the cation is selected from the group consisting of imidazoles, pyrazoles, thiazoles, isothiazoles, azathiozoles, oxothiazoles, oxazines, oxazolines, oxazaboroles, dithiozoles, triazoles, delenozoles, oxaphospholes, pyrroles, boroles, furans, thiophenes, phospholes, pentazoles, indoles, indolines, oxazoles, isoxazoles, isotetrazoles, tetrazoles, benzofurans, dibenzofurans, benzothiophenes, dibenzothiophenes, thiadiazoles, pyridines, pyrimidines, pyrazines, pyridazines, piperazines, piperidines, morpholones, pyrans, annolines, phthalazines, quinazolines, guanidiniums, quinxalines, choline-based analogues, derivatives thereof, and combinations thereof, and wherein the anion is selected from the group consisting of halogens, phosphates, alkylphosphates, alkenylphosphates, $BF_4^-$, $PF_6^-$, $AsF_6^-$, $NO_3^-$, $N(CN)_2^-$, $N(SO_3CF_3)_2^-$, amino acids, substituted or unsubstituted carboranes, perchlorates, pseudohalogens, metal chloride-based Lewis acids, $C_{1-6}$ carboxylates, and combinations thereof.

Preferred anions for ionic liquids useful in the processes described herein are $C_1$-$C_6$ carboxylates such as formate, acetate, propionate, butyrate, lactate, pyruvate, maleate, fumarate, valerate, hexanoate, heptanoate, or oxalate.

A preferred cation for ionic liquids useful in the processes described herein is the imidazolium cation having the following formula:

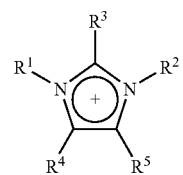

wherein $R^1$ and $R^2$ are independently a $C_1$-$C_6$ alkyl or $C_2$-$C_6$ alkoxyalkyl group, and $R^3$, $R^4$, $R^5$ are independently hydrogen, a $C_1$-$C_2$ alkyl, $C_2$-$C_6$ alkoxyalkyl, or $C_1$-$C_6$ alkoxy group. In the above formula, $R^3$-$R^5$ are preferably each hydrogen and $R^1$ and $R^2$ are independently $C_1$-$C_6$ alkyl or $C_2$-$C_6$ alkoxyalkyl. More preferably, one of $R^1$ and $R^2$ is methyl and the other is $C_1$-$C_6$ alkyl. A particularly preferred ionic fluid is 1-ethyl-3-methylimidazolium acetate (EMIMAc).

As broadly described, processes described herein for fractionating a lignocellulosic biomass material into a cellulose-enriched fraction and/or a lignin-enriched fraction involve contacting the lignocellulosic material with an ionic liquid under conditions that dissolve cellulose and hemicellulose of the lignocellulosic material into the ionic liquid and dissolve lignin of the lignocellulosic material into the ionic liquid while leaving a portion of the lignocellulosic material undissolved. The resulting mixture of dissolved cellulose, dissolved hemicellulose dissolved lignin, undissolved lignin, undissolved cellulose, undissolved hemicellulose, extractives, and ionic liquid is then separated into a cellulose-enriched fraction and/or a lignin-enriched fraction. The resulting cellulose-enriched fraction and/or a lignin-enriched fraction can be further processed to isolate the cellulose, hemicellulose, and/or lignin for further processing.

The size of the lignocellulosic biomass material contacted with the ionic liquid can vary over a wide range, e.g., from ball-milled powder to wood chip size. There are numerous definitions for the size of wood chips. One common definition defines wood chips as having a width and thickness that is less than 7 mm and greater than 3 mm and having a variable length of about 10-30 mm. The particular size of the lignocellulosic material used in the processes described herein is not critical. Generally, the smaller the size of the lignocellulosic material, the faster its dissolution rate in the ionic liquid.

The lignocellulosic material is contacted with ionic liquids in a batch basis or a continuous basis. Batch contact can occur in a tank or a batch reactor while continuous contact can occur in a reactor (cocurrent or countercurrent). The contact between the lignocellulosic material and the ionic liquid can be carried out under an inert atmosphere such as argon or nitrogen or under a normal air atmosphere. Inert atmospheres are preferred if the ionic liquid used is susceptible to absorbing an excess amount of water from the air. The presence of excess water in the mixture from either the biomass or water absorbed by the ionic liquid may impede the dissolution of the biomass.

In accordance with the processes described herein, the lignocellulosic material is contacted with the ionic liquid at temperatures above the melting point of the ionic liquid in order to maintain the ionic liquid in a liquid state. While the dissolution rate of the lignocellulosic material in the ionic liquid can be increased by increasing the temperature at which the contact between the two materials occurs, the temperature should not be so high as to degrade the cellulose, lignin, hemicellulose, or ionic liquids. The temperature at which the lignocellulosic material is contacted with the ionic liquid should take into account the desired viscosity of the mixture. Higher temperatures will provide mixtures of lower viscosity compared to the viscosity of mixtures at lower temperatures. An exemplary temperature range is from about room temperature to 140° C.

The amount of lignocellulosic material contacted with the ionic liquid can vary over a wide range and can also affect the viscosity of the mixture. For example, amounts of lignocellulosic material that provide up to 30 weight percent solids in the ionic liquids based on oven-dried lignocellulosic material are suitable for the processes described herein. If the degree of polymerization of the cellulose, lignin, or hemicellulose is such that at the above concentrations the viscosity is outside desired ranges, the concentration of the lignocellulosic material in the ionic liquid can be lowered to achieve a desirable viscosity for the mixture.

When the ionic liquid is contacted with the lignocellulosic material, cellulose and lignin begin to dissolve in the ionic liquid. Depending upon the length of time that contact between the ionic liquid and the lignocellulosic material is maintained, either a portion or all of the cellulose and lignin is dissolved in the ionic liquid. In addition, hemicellulose also dissolves in the ionic liquid. Depending upon their composition, extractives will also dissolve in the ionic liquid.

The length of time that the lignocellulosic material is contacted with the ionic liquid can vary over a large range. The length of time that the lignocellulosic material is contacted with the ionic liquid should be sufficient so that enough cellulose and hemicellulose is dissolved to produce a cellulose-enriched fraction when the separation described below in more detail is carried out and/or that is sufficient to provide a lignin-enriched fraction when the separation techniques set forth below in more detail are carried out. The appropriate length of time will vary based on factors such as biomass, particle size, temperature, method of agitation, pressure, and ionic liquid. Exemplary contact times can range from one hour to about 16 hours.

In accordance with the embodiments described herein, once a portion of cellulose and hemicellulose in the lignocellulosic material and less than all the lignin in the lignocellulosic material has dissolved into the ionic liquid, the mixture containing dissolved cellulose, undissolved cellulose (if any), dissolved hemicellulose, undissolved hemicellulose (if any) dissolved lignin, undissolved lignin, and ionic liquid is separated into a cellulose-enriched fraction and/or a lignin-enriched fraction.

One method for separating the mixture of ionic liquid, dissolved cellulose, dissolved hemicellulose, undissolved cellulose, undissolved hemicellulose, dissolved lignin, and undissolved lignin into a cellulose-enriched fraction is to centrifuge the mixture. Centrifuging the mixture produces a top layer generally comprised of cellulose, hemicellulose, and lignin dissolved in the ionic liquid and a bottom layer comprised of undissolved lignin, undissolved cellulose, undissolved hemicellulose, and a portion of the ionic liquid solution containing dissolved cellulose and dissolved lignin. As described above, the cellulose-enriched fraction is characterized by a weight percent glucose solids from the dissolved cellulose and dissolved hemicellulose in the fraction that is at least about 10 percentage points, and more preferably at least about 15 percentage points, greater than the weight percent of glucose making up the cellulose and hemicellulose in the beginning lignocellulosic material and the lignin-enriched fraction contains a weight percent of lignin that is at least 5 percentage points greater than the weight percent of lignin in the starting lignocellulosic material. Centrifuging is a desirable separation technique because it does not require environmentally unfriendly solvents. It should be understood that other techniques can be used to separate the mixture of ionic liquid, dissolved cellulose, undissolved Cellulose, dissolved hemicellulose, undissolved hemicellulose, dissolved lignin, and undissolved lignin into a cellulose-enriched fraction and/or a lignin-enriched fraction. For example, filtration techniques or other techniques that do not require solvents can be used to achieve the desired separation.

Prior to contacting the lignocellulosic material with the ionic liquid or at the same time that the lignocellulosic material is contacted with the ionic liquid, the lignocellulosic material may be subjected to a mild acid treatment, sometimes referred to as an acid hydrolysis. Acid hydrolysis is carried out by contacting the lignocellulosic material with an acid such as sulfuric acid. The acid hydrolysis reduces the degree of polymerization of the cellulose and breaks hemicellulose-lignin bonds. The acid hydrolysis pretreatment will result in the cellulose and lignin of the lignocellulosic material being dissolved in the ionic liquid more rapidly.

An additional, but optional, pretreatment step involves removal of water/moisture from the lignocellulosic material as well as unwanted extractives such as fatty acids, resin acids and terpenes. These objectives can be achieved by contacting the lignocellulosic material with a solvent, such as acetone, prior to mixing the lignocellulosic material with an ionic liquid.

Other techniques can be used to remove water from the lignocellulosic material, such as drying the lignocellulosic material. For lignocellulosic material such as wood chips, while not required, it is preferred that the wood chips be virtually water-free. Generally, dewatering of the lignocellulosic material is desired because the lower the moisture content of the lignocellulosic material, the more rapid the dissolution of the material into the ionic liquid. Another technique for water removal is heating the ionic liquid/biomass mixture under vacuum to a temperature sufficient to drive off the water.

The following examples illustrate specific embodiments of the processes and results achieved by the processes described herein.

EXAMPLE 1

Fractionation of Southern Pine Wood Chips

Southern pine wood chip pins were acetone-extracted to remove extractives by contacting the wood chips with acetone for 24 hours at a 4 to 1 (weight:weight) acetone to chips ratio, decanting off the acetone and repeating. The wood chips were dried for 2 hours at 105° C. prior to dissolution. 1-ethyl-3-methylimidazolium acetate (EMIMAc) was also heated to 105° C. prior to contacting the acetone-extracted southern pine pins with EMIMAc. The heated wood chip pins and ionic liquid were quickly weighed into a 250 ml, three-neck, round bottom flask. The flask was then transferred to a preheated 95° C. oil bath. The flask was connected to a mechanical stirrer with adapter and two ground glass stoppers. The mixture was then stirred for 1, 4, 8, 12, 16, 20, 24, 56, 64, 72, 80, and 88 hours. After the foregoing stirring times were complete, the flask was removed from the heat and the mixture was divided into two centrifuge tubes. The mixture was then centrifuged at 3000 rpm for 30 minutes. This centrifuging separated the mixtures into a clear, top layer and a dark, bottom layer.

For the 1, 4, and 8 hour reaction times, there was an occasional wood chip pin that had undergone limited alteration in the ionic liquid and floated to the top during centrifugation. Any such wood chip pins untouched by the ionic liquid were removed from the top of the centrifuge tube before decanting the top layer away from the remaining bottom layer. The solids in the top layer were then precipitated and washed multiple times with both room temperature and 75° C. deionized water to remove all residual ionic liquid. The solids were dried in a 105° C. oven. Masses were recorded and samples were submitted for monomeric sugar analysis using high-performance exchange chromatography and post amperometric detection (HPAEC/PAD). Table 2 below sets forth the results of the mass recordations and the sugar analysis. In Table 2, hours of contact, weight in grams glucose (from cellulose and hemicellulose), and combined weight in grams arabinose, galactose, xylose, and mannose are recorded, along with a calculated weight in grams of lignin for the top layer. The weight in grams of lignin for the top layer is calculated by subtracting the combined sugar monomer weight from the total weight of the sample.

TABLE 2

| | WEIGHT (grams) | | |
| --- | --- | --- | --- |
| HOURS | GLUCOSE | A, Ga, X, M* | LIGNIN |
| 0 | 0 | 0 | 0 |
| 1 | 1.08564 | 0.114125 | 0.460235 |
| 4 | 5.34786 | 0.612969 | 1.179171 |
| 8 | 7.19742 | 0.6122394 | 0.5303406 |
| 12 | 18.226 | 2.82386 | 4.95014 |
| 16 | 13.615 | 1.64465 | 2.24035 |
| 20 | 25.1536 | 5.809606 | 8.836794 |
| 24 | 21.6932 | 3.135117 | 3.271683 |
| 56 | 46.95 | 22.5 | 30.58 |
| 64 | 46.95 | 22.5 | 30.58 |
| 72 | 46.95 | 22.5 | 30.58 |
| 80 | 46.95 | 22.5 | 30.58 |
| 88 | 46.95 | 22.5 | 30.58 |

*A = Arabinose, Ga = Galactose, X = Xylose, M = Mannose.

The solids in the bottom layer were contacted with water and washed multiple times with both room temperature and 75° C. deionized water to remove all residual ionic liquid. Solids were collected via gravity filtration. The solids were dried in a 105° C. oven. When the top and bottom layers are precipitated with water, all the solids come out (i.e., both the solids that are dissolved in the ionic liquid and those that are undissolved.) At 1, 4, and 8 hours, there were starting wood chips that were virtually untouched by the ionic liquid. These chips or portions thereof floated to the top of the clear top layer during centrifugation and were removed, washed and analyzed separately for mass and sugar content. The mass and sugar results for the bottom layer and the chip portions which floated to the top were combined and reported in Table 3 for hours 1, 4, and 8. In Table 3, hours of contact, weight in grams glucose and combined weight in grams arabinose, galactose, xylose, and mannose are recorded, along with the calculated weight in grams of lignin for the bottom layer (at hours 12 through 88) and the combined bottom layer and undissolved wood chips at hours 1, 4, and 8). The mass and sugar content analysis results of the precipitated bottom layer alone (without the undissolved chips) at 1, 4, and 8 hours are reported in Table 3a.

TABLE 3

| | WEIGHT (grams) | | |
| --- | --- | --- | --- |
| HOURS | GLUCOSE | A, Ga, X, M* | LIGNIN |
| 0 | 46.95 | 22.5 | 30.58 |
| 1 | 45.43998 | 20.922284 | 30.119765 |
| 4 | 39.45282 | 19.980978 | 29.400829 |
| 8 | 39.855654 | 20.051749 | 30.049659 |
| 12 | 27.972 | — | 25.62986 |
| 16 | 31.68 | 17.7705 | 28.33965 |
| 20 | 23.478 | 13.32828 | 21.743206 |
| 24 | 26.603 | 16.35725 | 27.308317 |
| 56 | 0 | 0 | 0 |
| 64 | 0 | 0 | 0 |
| 72 | 0 | 0 | 0 |
| 80 | 0 | 0 | 0 |
| 88 | 0 | 0 | 0 |

*A = Arabinose, Ga = Galactose, X = Xylose, M = Mannose.

TABLE 3a

| | WEIGHT (grams) | | |
|---|---|---|---|
| HOURS | GLUCOSE | A, Ga, X, M* | LIGNIN |
| 1 | 42.2704 | 19.44074 | 29.38886 |
| 4 | 38.2974 | 19.36446 | 32.23814 |
| 8 | 39.7155 | 19.9947 | 31.5898 |

*A = Arabinose, Ga = Galactose, X = Xylose, M = Mannose.

Table 4 below reports the weight percent of components present in the top layer at various reaction times. Table 4 includes the weight percent glucose (from cellulose and hemicellulose), a combined weight percent for arabinose, galactose, xylose, and mannose, a total sugar monomer weight percent, and a calculated lignin weight percent. The lignin weight percent is calculated by subtracting the total sugar monomer weight percent from 100.

TABLE 4

| | WEIGHT % | | | |
|---|---|---|---|---|
| HOURS | GLUCOSE | A, Ga, X, M* | TOTAL SUGAR MONOMER | LIGNIN |
| 0 | 0 | 0 | 0 | 0 |
| 1 | 65.4 | 6.875 | 72.275 | 27.73 |
| 4 | 74.9 | 8.585 | 83.485 | 16.52 |
| 8 | 86.3 | 7.341 | 93.641 | 6.359 |
| 12 | 70.1 | 10.861 | 80.96 | 19.04 |
| 16 | 77.8 | 9.398 | 87.198 | 12.8 |
| 20 | 63.2 | 14.597 | 77.797 | 22.2 |
| 24 | 77.2 | 11.157 | 88.357 | 11.64 |
| 56 | 47 | 22.5 | 69.5 | 30.58 |
| 64 | 47 | 22.5 | 69.5 | 30.58 |
| 72 | 47 | 22.5 | 69.5 | 30.58 |
| 80 | 47 | 22.5 | 69.5 | 30.58 |
| 88 | 47 | 22.5 | 69.5 | 30.58 |

*A = Arabinose, Ga = Galactose, X = Xylose, M = Mannose.

In Table 4, the glucose (from cellulose and hemicellulose) weight percent for the top layer ranges from 63.2 to 86.3% (between the hours of 1-24 hours). Since the wood chip was completely dissolved at 56 hours, Table 4 also reports that the glucose content (from cellulose and hemicellulose) of the beginning lignocellulosic material was 47 weight percent. The results reported in Table 4 illustrate how processes carried out in accordance with the present disclosure produce a cellulose-enriched fraction characterized by a weight percent glucose solids attributable to cellulose and hemicellulose in the fraction that is at least 10 percentage points greater than the weight percent glucose making up the cellulose and hemicellulose in the beginning lignocellulosic material.

Table 5 reports weight percents of the noted components in either the combination of the bottom layer and the undissolved wood chips that were observed at the stirring times of 1, 4, and 8 hours and for the bottom layer observed at the 12, 16, 20, 24, 56, 64, 72, 80, and 88 hour stirring times. Table 5a below reports the weight percents of the noted components in the bottom layer only (without undissolved wood chips) at hours 1, 4, and 8. Tables 5 and 5a report the weight percent glucose (from cellulose and hemicellulose), combined weight percent arabinose, galactose, xylose, and mannose, the total sugar monomer weight percent, and calculated weight percent lignin.

TABLE 5

| | WEIGHT % | | | |
|---|---|---|---|---|
| HOURS | GLUCOSE | A, Ga, X, M* | TOTAL SUGAR MONOMER | LIGNIN |
| 0 | 46.95 | 22.5 | 69 | 30.58 |
| 1 | 45.43998 | 20.922284 | 66.362264 | 31.957736 |
| 4 | 39.45282 | 19.980978 | 59.433798 | 33.406202 |
| 8 | 39.855654 | 20.051749 | 59.907403 | 31.721597 |
| 12 | 37.8 | 21.18 | 58.98 | 41.02 |
| 16 | 38.4 | 21.54 | 59.94 | 40.06 |
| 20 | 39 | 22.14 | 61.14 | 38.86 |
| 24 | 37 | 22.75 | 59.75 | 40.25 |
| 56 | 0 | 0 | 0 | 0 |
| 64 | 0 | 0 | 0 | 0 |
| 72 | 0 | 0 | 0 | 0 |
| 80 | 0 | 0 | 0 | 0 |
| 88 | 0 | 0 | 0 | 0 |

*A = Arabinose, Ga = Galactose, X = Xylose, M = Mannose.

Table 5 reports lignin weight percents in the bottom layer at hours 12 through 24 that range from 38.86 to 41.02. Table 5 also reports that the lignin content of the beginning lignocellulosic material was 30.58 weight percent. The results reported in Table 5 illustrate how processes carried out in accordance with the present disclosure produce lignin-enriched fractions wherein the lignin weight percent is at least 5 percentage points greater than the lignin content of the beginning lignocellulosic material.

TABLE 5a

| | WEIGHT % | | | |
|---|---|---|---|---|
| HOURS | GLUCOSE | A, Ga, X, M* | TOTAL SUGAR MONOMER | LIGNIN |
| 1 | 46.4 | 21.34 | 67.74 | 32.26 |
| 4 | 42.6 | 21.54 | 64.14 | 35.86 |
| 8 | 43.5 | 21.9 | 65.4 | 34.6 |

*A = Arabinose, Ga = Galactose, X = Xylose, M = Mannose.

Table 5a reports lignin weight percents in the bottom layer at hours 1, 4, and 8 that range from 32.26 to 35.86. As noted above with respect to Table 5, the lignin content of the beginning lignocellulosic material was 30.58 weight percent. The results reported in Table 5a illustrate how the process carried out in accordance with the present disclosure at 4 hours produced a lignin-enriched fraction wherein the lignin weight percent was at least 5 percentage points greater than the lignin content of the beginning lignocellulosic material.

EXAMPLE 2

Fractionation of Southern Pine Wood Chips with Acid Hydrolysis

Extraction, dissolution, fractionation, and sugar analysis were carried out in the same manner as described above in Example 1 with the exception that after the flask containing the wood chip pins and ionic liquid was transferred to the preheated oil bath, concentrated sulfuric acid having a concentration of 5.5 weight percent of the starting biomass was added quickly via syringe.

Table 6 below sets forth the results of the mass recordations and the sugar analysis. In Table 6, hours of contact, weight in grams glucose and combined weight in grams arabinose, galactose, xylose, and mannose are recorded, along with the calculated weight in grams of lignin for the top layer.

TABLE 6

| | WEIGHT (grams) | | |
|---|---|---|---|
| HOURS | GLUCOSE | A, Ga, X, M* | LIGNIN |
| 0 | 0 | 0 | 0 |
| 1 | 0.77343 | 0.0836295 | 0.4129405 |
| 4 | 1.3158 | 0.1517685 | 0.6824315 |
| 8 | 6.93873 | 0.4877007 | 0.8635693 |
| 12 | 11.9564 | 1.26735 | 0.97625 |
| 16 | 23.7897 | 2.940894 | 2.969406 |
| 20 | 19.25389 | 4.5897352 | 5.8691681 |
| 24 | 19.185697 | 3.2686845 | 4.9146586 |
| 56 | 46.95 | 22.50 | 30.55 |
| 64 | 46.95 | 22.50 | 30.55 |
| 72 | 46.95 | 22.50 | 30.55 |
| 80 | 46.95 | 22.50 | 30.55 |
| 88 | 46.95 | 22.50 | 30.55 |

*A = Arabinose, Ga = Galactose, X = Xylose, M = Mannose.

In Table 7, hours of contact, weight in grams glucose (from cellulose and hemicellulose) and combined weight in grams arabinose, galactose, xylose, and mannose are recorded, along with the weight in grams of lignin for the bottom layer. The values in Table 7 for hours 1 and 4 include mass attributable to undissolved wood chip pins that were floating on the surface after completion of centrifugation. Table 7a below reports mass values for the components of the bottom layer only (without undissolved chips) at hours 1 and 4.

TABLE 7

| | WEIGHT (grams) | | |
|---|---|---|---|
| HOURS | GLUCOSE | A, Ga, X, M* | LIGNIN |
| 0 | 46.95 | 22.50 | 30.55 |
| 1 | 45.0307 | 20.474784 | 33.274516 |
| 4 | 43.30496 | 20.339382 | 34.225658 |
| 8 | 35.8547 | 17.37715 | 38.46815 |
| 12 | 35.0064 | 18.80736 | 31.98624 |
| 16 | 26.1516 | 14.61537 | 29.53303 |
| 20 | 26.498277 | 16.046569 | 27.74236 |
| 24 | 27.890288 | 15.724603 | 29.016068 |
| 56 | 0 | 0 | 0 |
| 64 | 0 | 0 | 0 |
| 72 | 0 | 0 | 0 |
| 80 | 0 | 0 | 0 |
| 84 | 0 | 0 | 0 |

*A = Arabinose, Ga = Galactose, X = Xylose, M = Mannose.

TABLE 7a

| | WEIGHT (grams) | | |
|---|---|---|---|
| HOURS | GLUCOSE | A, Ga, X, M* | LIGNIN |
| 1 | 42.3192 | 19.2192 | 30.8616 |
| 4 | 42.7052 | 20.04156 | 33.65324 |

*A = Arabinose, Ga = Galactose, X = Xylose, M = Mannose.

Table 8 below reports the weight percent of the top layer at various mixture times. Table 8 reports the weight percent glucose, a combined weight percent for arabinose, galactose, xylose, and mannose, a total sugar monomer weight percent, and a lignin weight percent.

TABLE 8

| | WEIGHT % | | | |
|---|---|---|---|---|
| HOURS | GLUCOSE | A, Ga, X, M* | TOTAL SUGAR MONOMER | LIGNIN |
| 0 | 0 | 0 | 0 | 0 |
| 1 | 60.9 | 6.585 | 67.485 | 32.515 |
| 4 | 61.2 | 7.059 | 68.259 | 31.741 |
| 8 | 83.7 | 5.883 | 89.582 | 10.418 |
| 12 | 84.2 | 8.925 | 93.125 | 6.875 |
| 16 | 80.1 | 9.902 | 90.002 | 9.998 |
| 20 | 64.8 | 15.45 | 80.247 | 19.753 |
| 24 | 70.1 | 11.94 | 82.043 | 17.957 |
| 56 | 46.95 | 22.50 | 69.45 | 30.55 |
| 64 | 46.95 | 22.50 | 69.45 | 30.55 |
| 72 | 46.95 | 22.50 | 69.45 | 30.55 |
| 80 | 46.95 | 22.50 | 69.45 | 30.55 |
| 88 | 46.95 | 22.50 | 69.45 | 30.55 |

*A = Arabinose, Ga = Galactose, X = Xylose, M = Mannose.

Due to the fact that the wood chip was completely dissolved at 56 hours, Table 8 reports that the weight percent glucose (from cellulose and hemicellulose) present in the starting lignocellulosic material of this example was 46.95%. Table 8 reports that the glucose weight percent present in the top layer ranged from 60.9 to 84.2%. The results reported in Table 8 illustrate how processes carried out in accordance with the present disclosure produce a cellulose-enriched fraction characterized by a weight percent glucose solids attributable to cellulose and hemicellulose in the fraction that is at least 10 percentage points greater than the weight percent glucose making up the cellulose and hemicellulose in the starting lignocellulosic material.

Table 9 below reports weight percents of the noted components in the combination of the bottom layer and the undissolved wood chips that were observed at the mixture times of 1 and 4 hours and for the bottom layer alone observed at the balance of the mixture times. Table 9a below reports weight percents of the noted components in the bottom layer only (without undissolved chips) at hours 1 and 4. Tables 9 and 9a report the weight percent glucose, combined weight percent arabinose, galactose, xylose, and mannose, the total sugar monomer weight percent, and weight percent lignin.

TABLE 9

| | WEIGHT % | | | |
|---|---|---|---|---|
| HOURS | GLUCOSE | A, Ga, X, M* | TOTAL SUGAR MONOMER | LIGNIN |
| 0 | 46.95 | 22.50 | 69.45 | 30.55 |
| 1 | 45.0307 | 20.474784 | 65.505484 | 33.274516 |
| 4 | 43.30496 | 20.339382 | 63.644342 | 34.225658 |
| 8 | 39.1 | 18.95 | 58.05 | 41.95 |
| 12 | 40.8 | 21.92 | 62.72 | 37.28 |
| 16 | 37.2 | 20.79 | 57.99 | 42.01 |
| 20 | 37.7 | 22.83 | 60.53 | 39.47 |
| 24 | 38.4 | 21.65 | 60.05 | 39.95 |
| 56 | 0 | 0 | 0 | 0 |
| 64 | 0 | 0 | 0 | 0 |
| 72 | 0 | 0 | 0 | 0 |
| 80 | 0 | 0 | 0 | 0 |
| 88 | 0 | 0 | 0 | 0 |

*A = Arabinose, Ga = Galactose, X = Xylose, M = Mannose.

Table 9 reports that the weight percent of lignin present in the beginning lignocellulosic material was 30.55%. Table 9 reports that the weight percent lignin in the bottom layer alone (at hours 8 through 24) ranged from 37.28 to 42.01 weight percent. Table 9 illustrates how processes carried out in accordance with the present disclosure at hours 8 through 24 produce lignin-enriched fractions having a lignin weight percent that is at least 5 percentage points greater than the lignin weight percent of the original starting lignocellulosic material.

TABLE 9a

| | | WEIGHT % | | |
|---|---|---|---|---|
| HOURS | GLUCOSE | A, Ga, X, M* | TOTAL SUGAR MONOMER | LIGNIN |
| 1 | 45.8 | 20.8 | 66.6 | 33.4 |
| 4 | 44.3 | 20.79 | 65.09 | 34.91 |

*A = Arabinose, Ga = Galactose, X = Xylose, M = Mannose.

Table 9a reports that the weight percent lignin in the bottom layer alone (without undissolved wood chips) at hours 1 and 4 ranged from 33.4 to 34.91.

EXAMPLE 3

Fractionation of Switchgrass

Dissolution, fractionation, and sugar analysis of switchgrass was also carried out as described in Example 1 with the exception that switchgrass was used instead of wood chip pins.

Prior to contact with the ionic liquid, the switchgrass was run through a chipper two times to reduce the size to approximately 15 millimeters in length. No acetone extraction was performed and the switchgrass was dried in the same manner as the wood chip pins in Example 1. A substantially higher amount of biomass floated to the top during centrifugation of the switchgrass reaction mixtures compared to the amount of biomass that floated to the top during centrifugation of the wood chip pins in Example 1.

Table 10 below sets forth the results of the mass recordations and the sugar analysis. In Table 10, hours of contact, weight in grams glucose (from cellulose and hemicellulose), weight in grams xylose, a combined weight in grams for arabinose, galactose, and mannose are recorded along with the weight in grams of lignin plus extractives for the top layer. Because acetone extraction to remove extractives was not carried out, the non-sugar monomer components include lignin and extractives and are reported as "other."

TABLE 10

| | WEIGHT (grams) | | | |
|---|---|---|---|---|
| HOURS | GLUCOSE | XYLOSE | A, Ga, M* | OTHER (LIGNIN AND EXTRACTIVES) |
| 0 | 0 | 0 | 0 | 0 |
| 2 | 2.812919 | 0.362646 | 0.27164 | 1.149068 |
| 4 | 3.503731 | 0.632463 | 0.217052 | 1.243769 |
| 6 | 4.125287 | 0.483761 | 0.223484 | 1.361593 |
| 8 | 10.634818 | 2.33360324 | 0.811061 | 3.144664 |
| 10 | 7.3656747 | 1.03926644 | 0.397208 | 1.4364747 |
| 12 | 10.60465 | 1.348974 | 0.583568 | 1.9325417 |
| 24 | 35.2 | 20.9 | 4.1 | 39.8 |
| 32 | 35.2 | 20.9 | 4.1 | 39.8 |
| 40 | 35.2 | 20.9 | 4.1 | 39.8 |

TABLE 10-continued

| | WEIGHT (grams) | | | |
|---|---|---|---|---|
| HOURS | GLUCOSE | XYLOSE | A, Ga, M* | OTHER (LIGNIN AND EXTRACTIVES) |
| 48 | 35.2 | 20.9 | 4.1 | 39.8 |
| 56 | 35.2 | 20.9 | 4.1 | 39.8 |

*A = Arabinose, Ga = Galactose, M = Mannose.

Table 11 below sets forth the results of the mass recordation and sugar analysis for the bottom layer combined with any undissolved switchgrass that was observed at mixture times of 2, 4, and 6 hours and for the bottom layer alone at the remaining mixture times. Table 11a below reports the results of the mass recordation and sugar analysis for the bottom layer only (without undissolved switchgrass) at hours 2, 4, and 6. In Tables II and 11a, hours of contact, combined weight in grams glucose, weight in grams xylose, and weight in grams arabinose, galactose, and mannose are recorded along with the weight in grams of lignin plus extractives (other).

TABLE 11

| | WEIGHT (grams) | | | |
|---|---|---|---|---|
| HOURS | GLUCOSE | XYLOSE | A, Ga, M* | OTHER (LIGNIN AND EXTRACTIVES) |
| 0 | 35.2 | 20.9 | 4.1 | 39.8 |
| 2 | 36.96298 | 26.05118 | 5.329491 | 27.06007 |
| 4 | 37.97052 | 24.72948 | 4.841437 | 26.86155 |
| 6 | 37.97759 | 24.97305 | 4.903596 | 25.95164 |
| 8 | 32.792308 | 24.0805668 | 4.218619 | 21.094741 |
| 10 | 35.249204 | 25.9263668 | 4.768853 | 18.110278 |
| 12 | 33.171135 | 25.4058824 | 7.242787 | 21.260756 |
| 24 | 0 | 0 | 0 | 0 |
| 32 | 0 | 0 | 0 | 0 |
| 40 | 0 | 0 | 0 | 0 |
| 48 | 0 | 0 | 0 | 0 |
| 56 | 0 | 0 | 0 | 0 |

*A = Arabinose, Ga = Galactose, M = Mannose.

TABLE 11a

| | WEIGHT (grams) | | | |
|---|---|---|---|---|
| HOURS | GLUCOSE | XYLOSE | A, Ga, M* | OTHER (LIGNIN AND EXTRACTIVES) |
| 2 | 24.85863 | 17.64373 | 4.148571 | 18.93913 |
| 4 | 29.3306 | 19.20896 | 4.056045 | 21.285 |
| 6 | 36.59483 | 24.03512 | 4.756424 | 24.97123 |

*A = Arabinose, Ga = Galactose, M = Mannose.

Table 12 below reports the weight percent of components for the top layer at various mixture times. Table 12 includes the weight percent glucose, weight percent xylose, a combined weight percent for arabinose, galactose, and mannose, a total sugar monomer weight percent, and a lignin plus extractives weight percent (other).

TABLE 12

| | WEIGHT % | | | | |
|---|---|---|---|---|---|
| HOURS | GLUCOSE | XYLOSE | A, Ga, M* | TOTAL SUGAR MONOMER | OTHER (LIGNIN AND EXTRACTIVES) |
| 0 | 0 | 0 | 0 | 0 | 0 |
| 2 | 61 | 7.9 | 5.91 | 75 | 25 |
| 4 | 63 | 11 | 3.878 | 77.778 | 22.222 |
| 6 | 67 | 7.8 | 3.608 | 78.018 | 21.982 |
| 8 | 60 | 13 | 4.553 | 77.353 | 22.647 |
| 10 | 66 | 9.3 | 3.543 | 74.271 | 25.729 |
| 12 | 68 | 8.7 | 2.953 | 79.603 | 20.397 |
| 24 | 35 | 21 | 4.1 | 60.2 | 39.8 |
| 32 | 35 | 21 | 4.1 | 60.2 | 39.8 |
| 40 | 35 | 21 | 4.1 | 60.2 | 39.8 |
| 48 | 35 | 21 | 4.1 | 60.2 | 39.8 |
| 56 | 35 | 21 | 4.1 | 60.2 | 39.8 |

*A = Arabinose, Ga = Galactose, M = Mannose.

Due to total dissolution at 24 hours, Table 12 reports that the glucose content (from cellulose and hemicellulose) of the beginning lignocellulosic material was 35 weight percent. Table 12 reports that the glucose content (from cellulose and hemicellulose) of the top layer ranged from 61 to 68 weight percent between 2-12 hours dissolution. The results reported in Table 12 illustrates how processes carried out in accordance with the present disclosure result in cellulose-enriched fractions characterized by a weight percent glucose attributable to cellulose and hemicellulose in the fraction that is at least 10 percentage points greater than the weight percent glucose making up the cellulose and hemicellulose in the beginning lignocellulosic material.

Table 13 below reports the weight percents of the noted components in either the combination of the bottom layer and the undissolved switchgrass that were observed at the mixture times of 2, 4, and 6 hours and for the bottom layer observed at the balance of the mixture times. Table 13a below reports weight percents to the noted components in the bottom layer only (without undissolved switchgrass) at hours 2, 4, and 6. Tables 13 and 13a report the weight percent glucose, weight percent xylose, combined weight percent arabinose, galactose, and mannose, the total sugar monomer weight percent, and a weight percent lignin plus extractives (other).

TABLE 13

| | WEIGHT % | | | | |
|---|---|---|---|---|---|
| HOURS | GLUCOSE | XYLOSE | A, Ga, M* | TOTAL SUGAR MONOMER | OTHER (LIGNIN AND EXTRACTIVES) |
| 0 | 35 | 21 | 4.1 | 60.2 | 39.8 |
| 2 | 37 | 26 | 5.329491 | 68.34 | 31.66 |
| 4 | 38 | 25 | 4.841437 | 67.54 | 32.46 |
| 6 | 38 | 25 | 4.903596 | 67.85 | 32.15 |
| 8 | 40 | 29 | 5.133 | 74.33 | 25.67 |
| 10 | 40 | 29 | 5.371 | 74.27 | 25.73 |
| 12 | 39 | 30 | 5.411 | 74.81 | 25.19 |
| 24 | 0 | 0 | 0 | 0 | 0 |
| 32 | 0 | 0 | 0 | 0 | 0 |
| 40 | 0 | 0 | 0 | 0 | 0 |
| 48 | 0 | 0 | 0 | 0 | 0 |
| 56 | 0 | 0 | 0 | 0 | 0 |

*A = Arabinose, Ga = Galactose, M = Mannose.

TABLE 13a

| | WEIGHT % | | | | |
|---|---|---|---|---|---|
| HOURS | GLUCOSE | XYLOSE | A, Ga, M* | TOTAL SUGAR MONOMER | OTHER (LIGNIN AND EXTRACTIVES) |
| 2 | 38 | 27 | 33.225 | 71.125 | 28.88 |
| 4 | 40 | 26 | 31.49 | 71.19 | 28.81 |
| 6 | 41 | 27 | 31.864 | 72.364 | 27.64 |

*A = Arabinose, Ga = Galactose, M = Mannose.

While illustrative embodiments have been illustrated and described, it will be appreciated that various changes can be made therein without departing from the spirit and scope of the invention.

The embodiments of the invention in which an exclusive property or privilege is claimed are defined as follows:

1. A process for fractionating a lignocellulosic material comprising cellulose, hemicellulose and lignin into a cellulose-enriched fraction, the process comprising:
    contacting the lignocellulosic material with a solvent wherein the solvent consists essentially of an ionic liquid;
    dissolving cellulose and hemicellulose of the lignocellulosic material into the ionic liquid;
    dissolving lignin of the lignocellulosic material into the ionic liquid while leaving a portion of the lignin of the lignocellulosic material undissolved, the resulting dissolved cellulose, dissolved hemicellulose, dissolved lignin, undissolved lignin and ionic liquid forming a mixture; and
    separating a cellulose-enriched fraction from the mixture, the cellulose-enriched fraction characterized by a weight percent of glucose solids that is at least about 10 percentage points greater than the weight percent glucose attributable to cellulose and hemicellulose in the lignocellulosic material.

2. The process of claim 1, wherein the ionic liquid comprises anions and cations, the anions selected from the group consisting of carboxylates, halides and phosphates and the cations selected from the group consisting of imidazoles, pyridines and pyrroles.

3. The process of claim 1, wherein the anion is a carboxylate.

4. The process of claim 1, wherein lignocellulosic material is selected from the group consisting of hardwood, softwood, energy crops, agricultural waste biomass, forest residuals, and recovered lignocellulosic fiber.

5. The process of claim 1, further comprising subjecting components of the mixture to acid hydrolysis.

6. The process of claim 1, wherein the lignocellulosic material is softwood chips.

7. The process of claim 1, wherein the lignocellulosic material is switchgrass.

8. The process of claim 1, wherein separating the mixture into a cellulose-enriched fraction is carried out in the presence of the ionic liquid and in the absence of another solvent.

9. The process of claim 1, wherein the ionic liquid is 1-ethyl-3-methylimidazolium acetate.

10. The process of claim 1, wherein the weight percent of glucose in the cellulose-enriched fraction is at least about 15 percentage points greater than the weight percent of glucose attributable to cellulose and hemicellulose in the lignocellulosic material.

11. A process for fractionating a lignocellulosic material comprising cellulose, hemicellulose and lignin into a cellulose-enriched fraction, the process comprising:
    contacting the lignocellulosic material with a solvent wherein the solvent consists essentially of an ionic liquid;
    dissolving cellulose and hemicellulose of the lignocellulosic material into the ionic liquid;
    dissolving lignin of the lignocellulosic material into the ionic liquid while leaving a portion of the lignin of the lignocellulosic material undissolved, the resulting dissolved cellulose, dissolved hemicellulose, dissolved lignin, undissolved lignin and ionic liquid forming a mixture; and
    centrifuging the mixture to produce a cellulose-enriched fraction characterized by a weight percent of glucose that is at least about 10 percentage points greater than the weight percent of glucose attributable to cellulose and hemicellulose in the lignocellulosic material.

12. A process for fractionating a lignocellulosic material comprising cellulose, hemicellulose and lignin into a lignin-enriched fraction, the process comprising:
    contacting the lignocellulosic material with a solvent wherein the solvent consists essentially of an ionic liquid;
    dissolving cellulose and hemicellulose of the lignocellulosic material into the ionic liquid;
    dissolving lignin of the lignocellulosic material into the ionic liquid while leaving a portion of the lignin of the lignocellulosic material undissolved, the resulting dissolved cellulose, dissolved hemicellulose, dissolved lignin, undissolved lignin, and ionic liquid forming a mixture; and
    separating a lignin-enriched fraction from the mixture, the lignin-enriched fraction characterized by a weight percent of lignin that is at least about 5 percentage points greater than the weight percent of lignin in the lignocellulosic material.

13. The process of claim 12, wherein the ionic liquid comprises anions and cations, the anions selected from the group consisting of carboxylates, halides and phosphates and the cations selected from the group consisting of imidazoles, pyridines and pyrroles.

14. The process of claim 13, wherein the anion is a carboxylate.

15. The process of claim 12, wherein lignocellulosic material is selected from the group consisting of hardwood, softwood, energy crops, agricultural waste biomass, forest residuals, and recovered lignocellulosic fiber.

16. The process of claim 12, wherein separating the mixture into a cellulose-enriched fraction is carried out in the presence of the ionic liquid and in the absence of another solvent.

17. The process of claim 12, wherein the ionic liquid is 1-ethyl-3-methylimidazolium acetate.

18. A process for fractionating a lignocellulosic material comprising cellulose, hemicellulose and lignin into a lignin-enriched fraction, the process comprising:
    contacting the lignocellulosic material with a solvent wherein the solvent consists essentially of an ionic liquid;
    dissolving cellulose and hemicellulose of the lignocellulosic material into the ionic liquid;
    dissolving lignin of the lignocellulosic material into the ionic liquid while leaving a portion of the lignin of the lignocellulosic material undissolved, the resulting dissolved cellulose, dissolved hemicellulose, dissolved lignin, undissolved lignin, and ionic liquid forming a mixture; and
    centrifuging the mixture to separate the dissolved lignin and undissolved lignin into a lignin-enriched fraction characterized by a weight percent of lignin that is at least about 5 percentage points greater than the weight percent of lignin in the lignocellulosic material.

19. A process for fractionating a lignocellulosic material comprising cellulose, hemicellulose and lignin into a cellulose-enriched fraction and a lignin-enriched fraction, the process comprising:
    contacting the lignocellulosic material with a solvent wherein the solvent consists essentially of an ionic liquid;
    dissolving cellulose and hemicellulose of the lignocellulosic material into the ionic liquid;

dissolving lignin of the lignocellulosic material into the ionic liquid while leaving a portion of the lignin of the lignocellulosic material undissolved, the resulting dissolved cellulose, dissolved hemicellulose, dissolved lignin, undissolved lignin and ionic liquid forming a mixture; and separating the mixture into a cellulose-enriched fraction characterized by a weight percent of glucose that is at least 10 percentage points greater than the weight percent glucose attributable to cellulose and hemicellulose in the lignocellulosic material and a lignin-enriched fraction characterized by a weight percent of lignin that is at least about 5 percentage points greater than the weight percent of lignin in the lignocellulosic material.

20. A process for fractionating a lignocellulosic material comprising cellulose, hemicellulose and lignin into a cellulose-enriched fraction and a lignin-enriched fraction, the process comprising:

contacting the lignocellulosic material with a solvent wherein the solvent consists essentially of an ionic liquid;

dissolving cellulose and hemicellulose of the lignocellulosic material into the ionic liquid;

dissolving lignin of the lignocellulosic material into the ionic liquid while leaving a portion of the lignin of the lignocellulosic material undissolved, the resulting dissolved cellulose, dissolved hemicellulose, dissolved lignin, undissolved lignin and ionic liquid forming a mixture; and centrifuging the mixture to separate the dissolved cellulose, dissolved hemicellulose, dissolved lignin, undissolved lignin and ionic liquid into a cellulose-enriched fraction characterized by a weight percent glucose that is at least about 10 percentage points greater than the weight percent glucose attributable to cellulose and hemicellulose in the lignocellulosic material and a lignin-enriched fraction characterized by a weight percent of lignin that is at least about 5 percentage points greater than the weight percent of lignin in the lignocellulosic material.

* * * * *